3,090,208
COOLING METHOD BY MEANS OF NEGATIVE PRESSURE GIVEN ON THE VORTEX TUBE
Ken-Iti Munakata, 85 1-chome, Kamikoshien Nishinomiya Hyogo-ken, Japan
Filed Jan. 12, 1960, Ser. No. 1,995
Claims priority, application Japan Jan. 19, 1959
4 Claims. (Cl. 62—5)

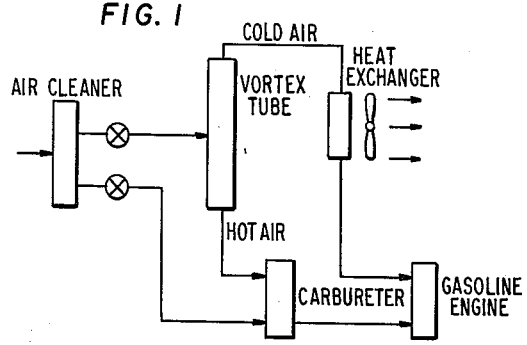
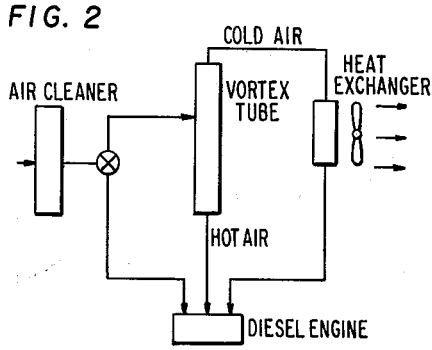
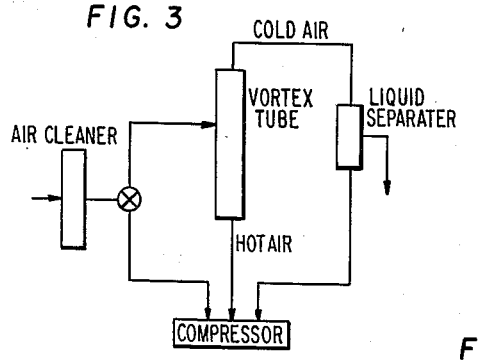
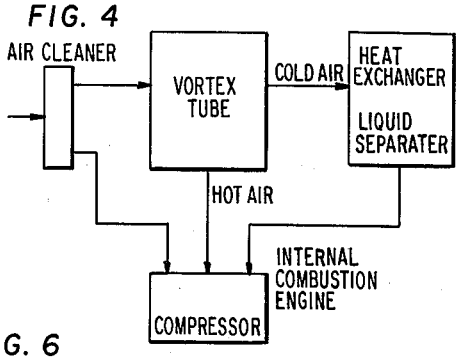
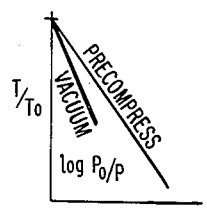
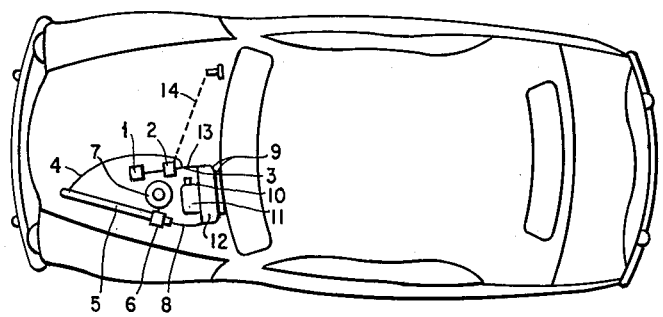
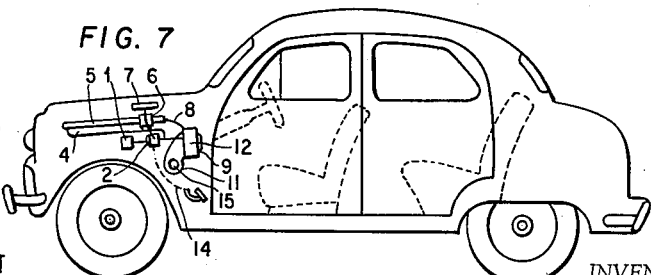
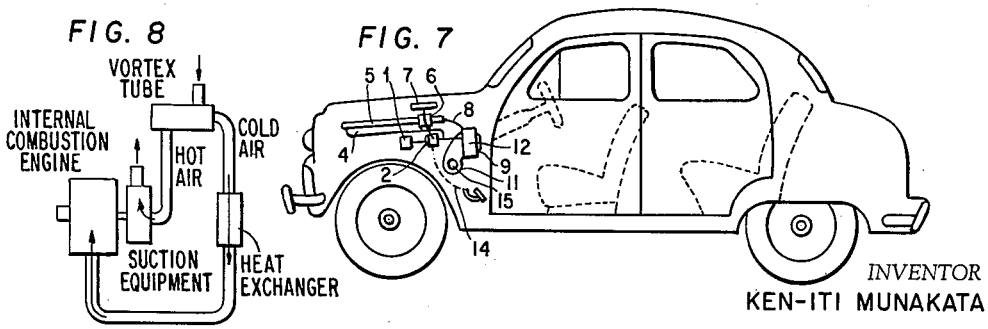

The present invention relates to the method of refrigeration utilizing a vortex tube (Ranque Hilsch tube) effectively, which is a long tube with a bottom wall, into which a jet stream of fluid, for example air, gas or vapour, is blown in through a nozzle provided tangentially to the inner surface of the tube from outside near the bottom in the perpendicular direction to the axis of the tube and from which a stream of fluid colder than that pressed in through the said nozzle runs out through one, near by the said nozzle, of the two holes respectively made on a bottom of the tube while another hot stream runs out through the other hole.

This invention aims to obtain effectively cold fluid out of one of the exhaust orifices by connecting with two exhaust orifices of the vortex tube the suction mouth of an engine such as vacuum pump, internal combustion engine etc. which sucks fluid at a negative pressure and by taking advantage of the suction of engine to force fluid in through the nozzle of vortex tube and then by setting to work vortex tube at pressure lower than atmospheric one.

In the figures, FIG. 1 to FIG. 4 are shown some applicative examples of the plan of piping using present invention. Fig. 5 shows the graphical curves appearing when the vortex tube is operated by precompressed fluid and negative pressure fluid.

Detailed Exposition of the Invention

FIG. 6 and FIG. 7 show an automobile which has the application of this invention in cooling its room. FIG. 6 is the plan of the automobile of which a part is cut off.
FIG. 7 is the profile of the same.
FIG. 8 is the schema of the arrangement by which hot fluid is sucked out of vortex tube by a suction equipment coupled with the internal combustion engine and cold fluid is sucked out of the said tube by the manifold of internal combustion engine.

Let us suppose that the pressure of fluid blown into the tube is $P_0$, the emperature $T_0$, the pressure of fluid at the moment of its passage through the hole of cold orifice is P and its temperature T, then if we draw a curve of suction by taking log $P_0/P$ on abscissa and $T/T_0$ on the ordinate, we discover that the curve drawn when fluid is pressed in through the nozzle, pressure at the orifices on the bottom being maintained the same as atmospheric pressure stay higher than that drawn when the pressure is maintained the same at the nozzle as atmospheric pressure and the pressure is lower at the orifices than the atmospheric pressure We found from the above fact that in utilizing a vortex tube effectiveness of refrigeration is more efficient if the fluid at the same degree as atmospheric pressure spurts in through the nozzle to eject out of the orifices with lower pressure than the atmospheric pressure rather than to spurt in the precompressed fluid from the nozzle into the said tube to eject same through the orifices lowering the pressure to the degree of the atmospheric pressure Consequently, it becomes clear that cooling efficiency in vortex tube is better when the fluid within the tube is sucked out through the orifices rather than when the compressed fluid is spurted into the tube.

The present invention consists of the application of the above-mentioned principle.

For example, as FIG. 1 shows, the present invention is applied to gasoline engine. In this arrangement suction pipe diverges into two branches. One branch is connected with the cold orifice of the vortex tube through the heat exchanger, while the other branch is connected with the outlet of carbureter and the inlet of the carbureter is connected with the hot orifice of the vortex tube and also with the outlet of air cleaner through valve, and the nozzle of vortex tube is connected with the outlet of the air cleaner through valve.

FIG. 2 shows an arrangement, for example, wherein the present invention is applied to diesel-engine. The suction pipe is ramified into three. The first one is connected with the cold orifice of the vortex tube through heat exchanger, the second with the hot orifice, and the third with the outlet of air cleaner through valve and the nozzle of vortex tube is connected with the outlet of air cleaner through valve.

FIG. 3 shows the arrangement the suction pipe of compressor is ramified into three.

The first is connected with the cold orifice of vortex tube through liquid separator, the second with the hot orifice of vortex tube and the third with the outlet of aircleaner through valve, and the nozzle of vortex tube is connected with the outlet of air cleaner through valve.

FIG. 1 and FIG. 2 show that fluid is let flow by means of negative pressure at the manifold of engine through the vortex tube and the cold fluid which is ejected from the cold orifice refrigerate by means of passing through the heat exchanger.

Thus this method has a number of advantages such as, for example, we can install, by this method, a cheap cooling equipment by reason of not giving too great pressure upon fluid, and also we can realize minimum mechanical loss by friction of machine by reason of the work of vortex tube at negative pressure, and likewise we can have a cooling equipment of high efficiency.

As a matter of course, rather better efficiency in refrigeration is obtainable, if the fluid from the hot orifice of the vortex tube is sent to the suction manifold of engine after cooling down nearly to the atmospheric temperature. Still, it cannot be denied that we can expect a high efficiency of engine by way of sending into the suction manifold of the engine the cold fluid which flows through the heat exchanger before warming it up to the atmospheric temperature.

In the case of arrangement, as FIG. 3 shows, because is used the cold fluid which was sucked into the vortex tube at the atmospheric temperature and because is flowed into the separator the cold fluid which flows out from the cold orifice of the vortex tube acting at negative pressure, we have great advantages in obtaining the fluid of low temperature and also in effectively separating liquid.

In this case, it is a matter of course that it is possible to get good efficiency of compression by cooling down through the heat exchanger and then pouring into the compressor the hot fluid after it comes out of the hot orifice of the vortex tube.

In short, as shown in FIG. 4, by way of connecting the outlets of the vortex tube with the suction mouth of internal combustion engine, compressor, vacuum pump etc. which produce negative pressure, effective cooling function is possible and thus high efficiency is obtained in liquid separation refrigeration etc.

Particularly when the outlets of the vortex tube is connected with the suction mouth of internal combustion engine, it is possible to effectively cool down the other fluid, by taking advantage of already existing pressure difference between atmospheric pressure and the pressure in the suction mouth. This way of cooling is possible without any use of another device of giving pressure difference between the outlets of the vortex tube and its inlet. This is also a great advantage of the present invention.

As illustrated in FIG. 8, either of the following two methods will do. The one is to suck hot fluid out of vortex tube by means of an equipment coupled with the internal combustion engine and to suck cold fluid out of the said tube by means of the manifold of the said engine. The other is to suck cold fluid out of vortex tube by the manifold of internal combustion engine, letting another equipment suck hot fluid out of the said tube. In these cases cooling is effected by making good use of the suction of internal combustion engine which has a limit to its sucking capicity.

Among the figures, 1 indicates carburetor, 2 indicates the change-valve which reaches out of vortex tube 5 and which changes by means of the wire maneuvered from the driver's seat the air coming out of the exhaust pipe 3 and the one out of air-cleaner 7.

The fluid sucked in through air-cleaner 7 is differentiated by the vortex tube 5 into cold air and hot air. And the former flows into exhaust pipe 14 through the pipe 8 and the heat exchanger 13, joining at exhaust pipe 3 with the hot air which comes out of exhaust pipe of hot air 4 and then flows into carburetor.

The air sucked in through air suction mouth 15 is cooled down in heat exchanger and then sent by motor 10 and fan 11 into the room from the diffusing mouth 9.

In this way, suction of air is fully utilized in order to set the vortex tube to work and differentiated cooled air is used to cool down the air to be supplied into the room of automobile, thus the room itself is comfortably air-conditioned.

It will be further apparent that changes may be made in the method and the resulting product without departing from the spirit of the invention defined in the following claims.

What I claim is:

1. A cooling device for use in association with a source of negative pressure, such as the inlet for an internal combustion engine, compressor and the like comprising a vortex tube having a cold fluid discharge and a hot fluid discharge, heat exchanger means connected to said cold fluid discharge, and means for connecting the hot fluid discharge to the source of negative pressure, said source of negative pressure being connected to said heat exchanger means for circulating cold fluid therethrough from said vortex tube.

2. A cooling system comprising an internal combustion engine having an air inlet maintained under negative pressure, a heat exchanger, a vortex tube including an inlet for directing fluid tangentially thereinto, a discharge for tapping cold air from said vortex tube connected to said heat exchanger, and a discharge for tapping hot air connected to said vortex tube to said internal combustion engine intake, said internal combustion engine being a gasoline engine including a carburetor disposed in said intake, said carburetor being connected to said vortex tube at the hot air tap means.

3. A cooling system comprising an internal combustion engine having an air inlet maintained under negative pressure, a heat exchanger, a vortex tube including an inlet for directing fluid tangentially thereinto, a discharge for tapping cold air from said vortex tube connected to said heat exchanger, and a discharge for tapping hot air connected to said vortex tube and to said internal combustion engine intake, said internal combustion engine being a diesel engine and including separate means connecting the inlet of said diesel engine with said vortex tube hot air tap means and said heat exchanger.

4. A cooling system comprising an internal combustion engine having an air inlet maintained under negative pressure, a heat exchanger, a vortex tube including an inlet for directing fluid tangentially thereinto, a discharge for tapping cold air from said vortex tube connected to said heat exchanger, and a discharge for tapping hot air connected to said vortex tube and to said internal combustion engine intake, said internal combustion engine inlet including a carburetor, an air cleaner, means for directing air through said air cleaner through the inlet of said vortex tube and to said carburetor, said hot air tap means of said vortex tube being connected to said carburetor.

References Cited in the file of this patent
UNITED STATES PATENTS

| | | |
|---|---|---|
| 2,175,162 | Waterfill | Oct. 3, 1939 |
| 2,650,582 | Green | Sept. 1, 1953 |
| 2,720,091 | Schelp | Oct. 11, 1955 |
| 2,770,103 | Florea | Nov. 13, 1956 |